United States Patent [19]

Westbrooks

[11] Patent Number: 5,450,785
[45] Date of Patent: Sep. 19, 1995

[54] CONE CUPCAKE BAKER

[76] Inventor: Fannie K. Westbrooks, 3049 Unionville-Deason Rd., Bell Buckle, Tenn. 37020

[21] Appl. No.: 373,766

[22] Filed: Jan. 17, 1995

[51] Int. Cl.⁶ .................. A47J 37/01; A47J 37/04
[52] U.S. Cl. ...................... 99/426; 99/383; 99/448; 211/14; 211/74
[58] Field of Search ............... 99/353, 426, 439, 440, 99/441, 448, 383; 211/13, 14, 74; 220/205; 249/119, 120; 294/143, 159; D7/672, 503

[56] References Cited

U.S. PATENT DOCUMENTS

| 451,166 | 4/1891 | Bryant | 99/440 |
|---|---|---|---|
| 992,396 | 5/1911 | Weber | 211/14 |
| 1,092,682 | 4/1914 | Weber | 211/14 |
| 1,165,304 | 12/1915 | Whittaker | 220/205 |
| 1,188,146 | 6/1916 | Bogley | 294/159 |
| 1,643,735 | 9/1927 | Baker | 211/13 |
| 1,992,712 | 2/1935 | Mojonnier | 249/120 |
| 2,982,420 | 5/1961 | Wannemacher | 211/74 |
| 3,154,209 | 10/1964 | Wilhite | 211/174 |
| 4,583,955 | 4/1986 | Toloczko | 99/426 |
| 5,207,150 | 5/1993 | Wellman et al. | 99/439 |
| 5,361,687 | 11/1994 | deVries | 99/426 |

FOREIGN PATENT DOCUMENTS 648193  3/1985  Switzerland ............ 211/74

Primary Examiner—Timothy F. Simone

[57] ABSTRACT

A cone cupcake baker comprising a housing having large parallel front and rear walls in a rectangular configuration with long horizontal edges and short vertical edges, the housing having essentially square shaped side panels with horizontal edges and vertical edges coupled to the vertical edges of the front and rear panels, a support plate or a rectangular configuration in a horizontal orientation positioned within the walls adjacent to the upper edges thereof, the support plate having a plurality of rows of apertures with a plurality of apertures in each row, the apertures adapted to support objects with their bases spaced separately from the lower edges of the panels; and support rods extending outwardly from the support panels and extending downwardly therefrom to a common elevational orientation beneath the lower edges of the panel.

4 Claims, 4 Drawing Sheets

CONE CUPCAKE BAKER

BACKGROUND OF THE INVENTION

1. Field of the Invention

The present invention relates to a cone cupcake baker and more particularly pertains to baking ice cream cone cupcakes while also providing storage and carrying units for the prepared cupcakes.

2. Description of the Prior Art

The use of baking racks and utensils of a wide variety of designs and configurations is known in the prior art. More specifically, baking racks and utensils of a wide variety of designs and configurations heretofore devised and utilized for the purpose of baking cupcakes and other sweets through various methods and apparatuses are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 3,590,728 a cone pan or mold.

U.S. Pat. No. 4,380,190 discloses one type of a cooking cone.

U.S. Pat. No. 4,583,955 discloses a cupcake holder.

U.S. Pat. No. 4,817,513 discloses one type of a cone baker.

U.S. Pat. No. Des. 291,620 discloses the design of an ice cream cone holder.

In this respect, the cone cupcake baker according to the present invention substantially departs from the conventional concepts and designs of the prior art, and in doing so provides an apparatus primarily developed for the purpose of baking ice cream cone cupcakes while also providing storage and carrying units for the prepared cupcakes.

Therefore, it can be appreciated that there exists a continuing need for a new and improved cone cupcake baker which can be used to bake ice cream cone cupcakes while also providing storage and carrying units for the prepared cupcakes. In this regard, the present invention substantially fulfills this need.

SUMMARY OF THE INVENTION

In view of the foregoing disadvantages inherent in the known types of baking racks and utensils of a wide variety of designs and configurations now present in the prior art, the present invention provides an improved cone cupcake baker. As such, the general purpose of the present invention, which will be described subsequently in greater detail, is to provide a new and improved cone cupcake baker and method which has all the advantages of the prior art and none of the disadvantages.

To attain this, the present invention essentially comprises a new and improved cone cupcake baker comprising, in combination, a housing having large parallel front and rear walls in a rectangular configuration with long horizontal edges and short vertical edges, the housing having essentially square shaped side panels with horizontal edges and vertical edges coupled to the vertical edges of the front and rear panels, a support plate of a rectangular configuration in a horizontal orientation is positioned within the walls adjacent to the upper edges thereof, the support plate having two rows of apertures with six apertures in each row, the apertures adapted to support ice cream cones with the base of each ice cream cone spaced separately from the lower edges of the panels; support rods extending outwardly from the side, front and rear panels and extending downwardly therefrom to a common elevational orientation beneath the lower edges of the panels; horizontal handles positioned on the side panels adjacent to the upper edges thereof, the handles extending outwardly to an extent greater than the lateral positioning of the lower supports; and a lid of a transparent elastomeric material having an upper rectangular plate of a size essentially to that of the housing and with downwardly extending front, rear and side plates in a rectangular configuration to cover the upper surface of the housing, the lower edges of the vertical plates extending outwardly and downwardly for positioning over the upper edges of the housing.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved cone cupcake baker which has all the advantages of the prior art baking racks and utensils of a wide variety of designs and configurations and none of the disadvantages.

It is another object of the present invention to provide a new and improved cone cupcake baker which may be easily and efficiently manufactured and marketed.

It is further object of the present invention to provide a new and improved cone cupcake baker which is of durable and reliable construction.

An even further object of the present invention is to provide a new and improved cone cupcake baker which is susceptible of a low cost of manufacture with regard to both materials and labor, and which accordingly is then susceptible of low prices of sale to the consuming public, thereby making such cone cupcake baker economically available to the buying public.

Still yet another object of the present invention is to provide a new and improved cone cupcake baker which provides in the apparatuses and methods of the prior art some of the advantages thereof, while simultaneously overcoming some of the disadvantages normally associated therewith.

Still another object of the present invention is to bake ice cream cone cupcakes while also providing storage and carrying units for the prepared cupcakes.

Lastly, it is an object of the present invention to provide new and improved cone cupcake baker comprising a housing having large parallel front and rear walls in a rectangular configuration with long horizontal edges and short vertical edges, the housing having essentially square shaped side panels with horizontal edges and vertical edges coupled to the vertical edges of the front and rear panels, a support plate or a rectangular configuration in a horizontal orientation positioned within the walls adjacent to the upper edges thereof, the support plate having a plurality of rows of apertures with a plurality of apertures in each row, the apertures adapted to support objects with their bases spaced separately from the lower edges of the panels; and support rods extending outwardly from the support panels and extending downwardly therefrom to a common elevational orientation beneath the lower edges of the panel.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
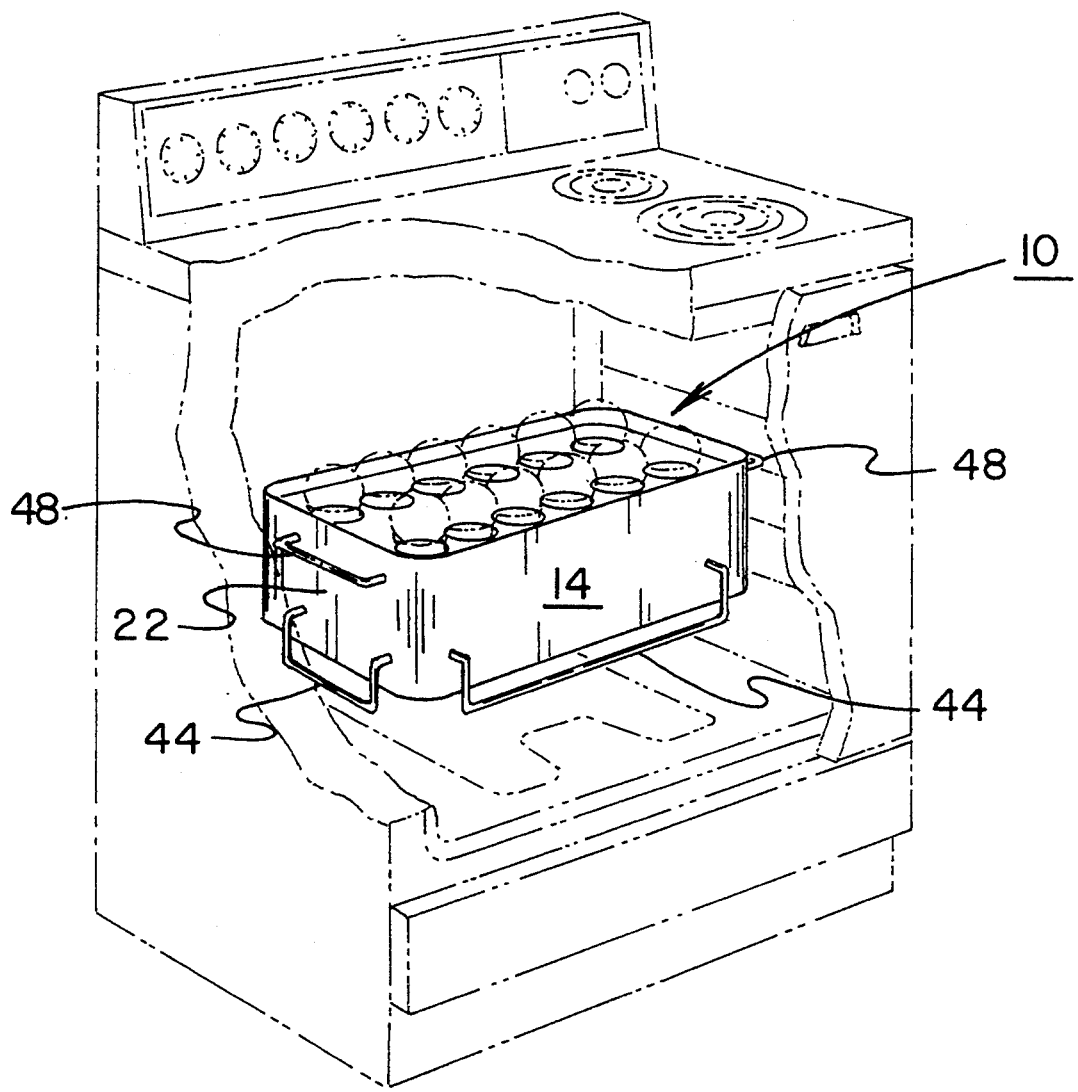
FIG. 1 is a perspective view of the preferred embodiment of the new and improved cone cupcake baker constructed in accordance with the principles of the present invention.
Figure 2:
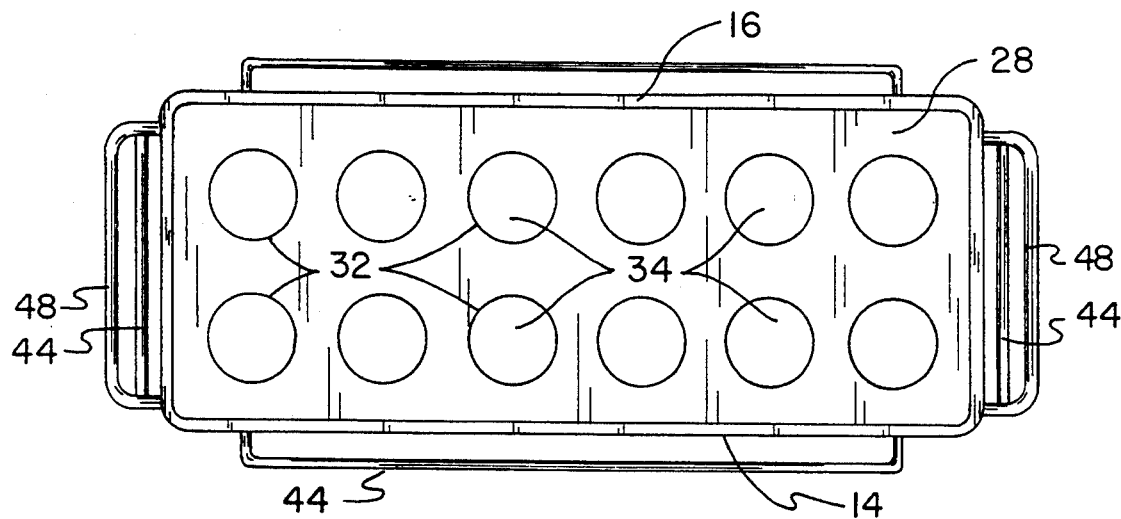
FIG. 2 is a top elevational view of the device shown in FIG. 1.
Figure 3:
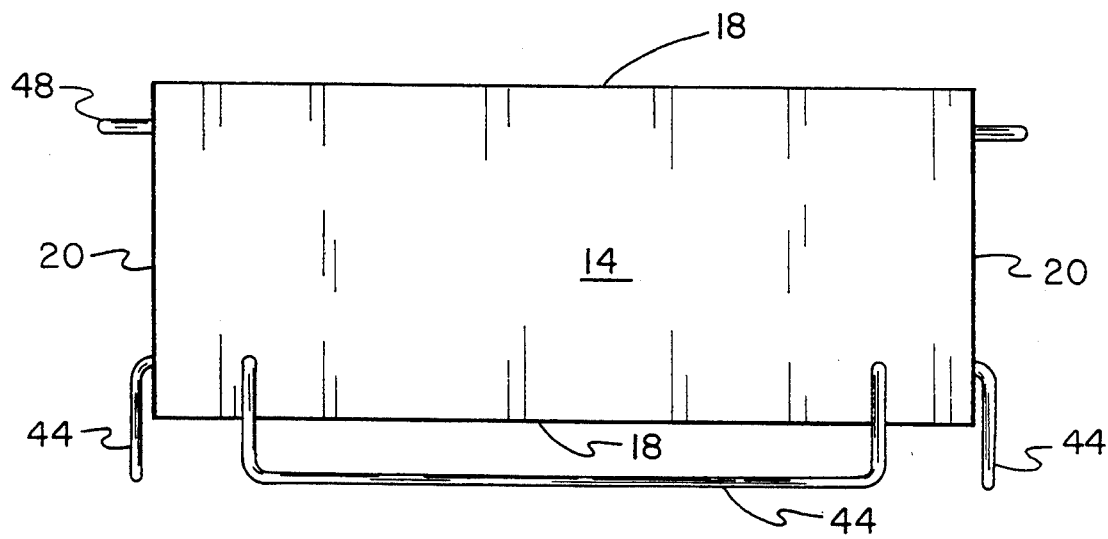
FIG. 3 is a side elevational view of the device shown in FIGS. 1 and 2.
Figure 4:
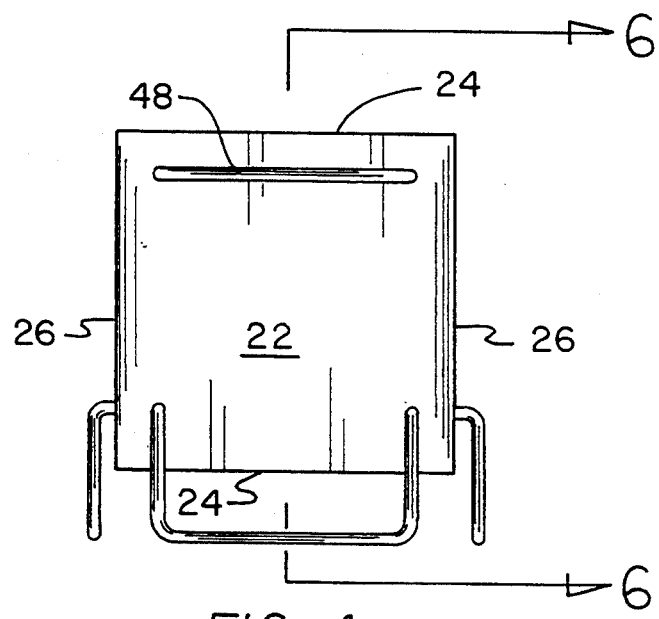
FIG. 4 is a side elevational view of the device shown in the prior Figures.
Figure 5:
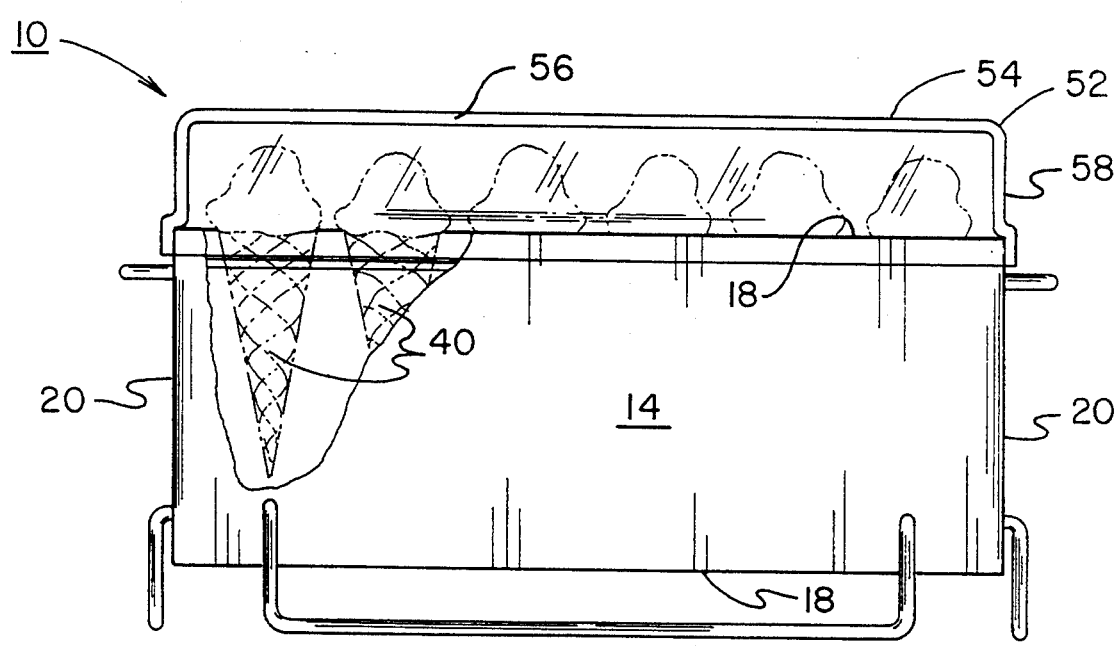
FIG. 5 is a side elevational view of the device shown in the prior Figures but with a cover thereover.
Figure 6:
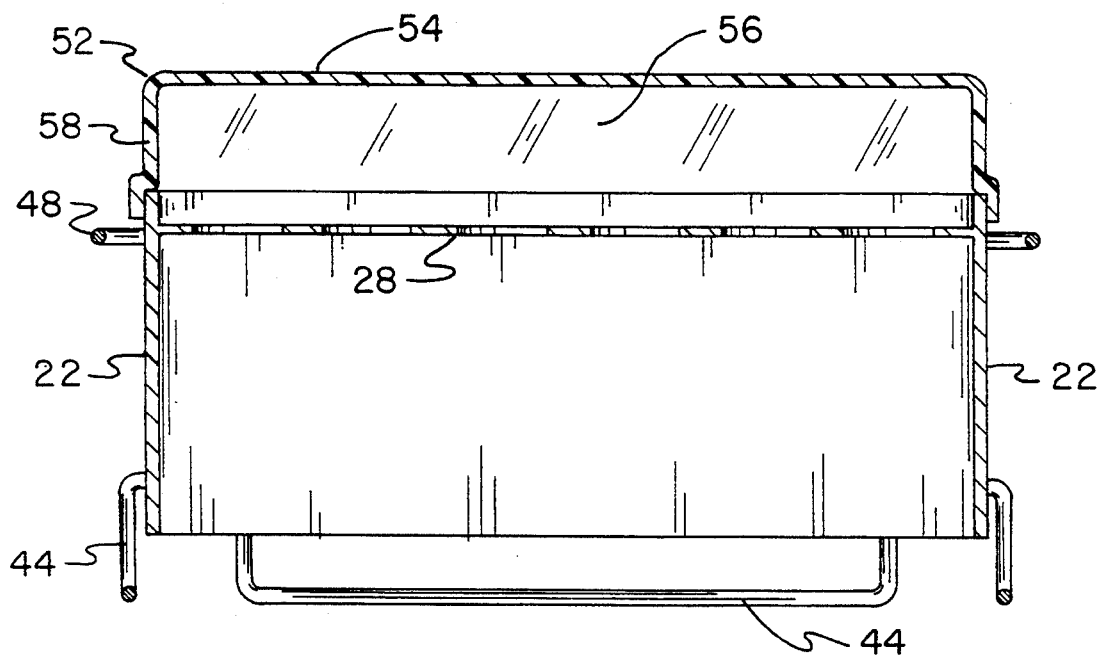
FIG. 6 is a cross-sectional view taken along line 6—6 of FIG. 4.
Figure 7:
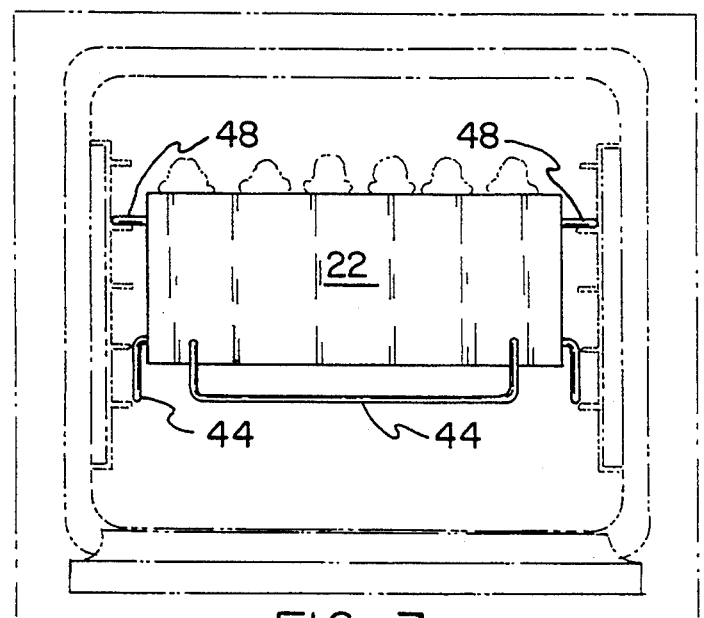
FIG. 7 is side elevational view of the device supported in an oven by its handle.

With reference now to the drawings, and in particular to FIG. 1 thereof, the preferred embodiment of the new and improved cone cupcake baker embodying the principles and concepts of the present invention and generally designated by the reference numeral 10 will be described.

The present invention, the new and improved cone cupcake baker, is a system 10 comprised of a plurality of components. Such components, in their broadest context, include a housing, support rods, horizontal handles and a lid. Such components are individually configured and correlated with respect to each other so as to attain the desired objective.

The system 10 of the present invention has as its central component a housing 12. Such housing has large parallel front and rear walls 14 and 16. Such walls are in a rectangular configuration with long horizontal edges 18 and short vertical edges 20. The housing has essentially square-shaped side panels 22. Such side panels have horizontal edges 24 and vertical edges 26 coupled at such vertical edges at the front and rear panels. A support plate 28 of a rectangular configuration in a horizontal orientation is positioned within the walls. Such positioning is at a location adjacent to the upper edges thereof.

The support plates have two rows 32 of apertures 34. It also has six apertures in each row. The apertures are adapted to support ice cream cones 40. The base of each ice cream is spaced separately from the lower edges of the panel.

Next provided are support rods 44. The support rods extend outwardly from the side, front and rear panels. They also extend downwardly therefrom to a common elevational orientation. Such extending is to a region beneath the lower edges of the panels.

Next provided are horizontal handles 48. Such handles are positioned on the side panels. They are located adjacent to the upper edges thereof. The handles extend outwardly to an extent greater than the lateral positioning of the lower supports.

Lastly provided is a lid 52. The lid is of a transparent elastomeric material. It has an upper rectangular plate 54. It is of a size essentially the same as that of the housing. It has downwardly extending front, rear and side plate 56 and 58. Such plates are in a rectangular configuration. Together they function to form the upper surface of the housing. The lower edges of the vertical plates extend outwardly and downwardly for positioning over the upper edges of the housing.

The present invention comprises a metal baking rack for baking ice cream cone cupcakes while also providing a storage and carrying unit for the prepared cupcakes.

The present invention is manufactured from a durable non-stick metal material. This rack is approximately 15 inches long and 6 inches wide and consists of a flat surface with twelve holes along the top, six on each side, in which the ice cream cones are placed. These holes are large enough so that the cone can be held securely, yet small enough to prevent it from falling through. Two metal handles are located along both sides of the device while an open bottom enables the cupcakes to bake evenly. Several metal bars along the bottom provide the unit with the stability to stand on its own during baking and storage. A snap-on plastic cover enables easy storage and transport.

The ice cream cones are placed in an upright position within the twelve holes on the rack. Cupcake batter is then poured into the cones. The rack is placed within the oven and appropriate baking procedures are followed. Once baked, the cupcakes are allowed to cool on the rack where they may also be frosted. If it is necessary to transport the cupcakes, the plastic cover is snapped into place on the rack for easy carrying.

This practical invention enables the user to conveniently bake and transport ice cream cone cupcakes that are favored by children.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved cone cupcake baker comprising, in combination:

a housing having large parallel front and rear walls in a rectangular configuration with long horizontal edges and short vertical edges, the housing having essentially square shaped side panels with horizontal edges and vertical edges coupled to the vertical edges of the front and rear panels, a support plate of a rectangular configuration in a horizontal orientation is positioned within the walls adjacent to the upper edges thereof, the support plate having two rows of apertures with six apertures in each row, the apertures adapted to support ice cream cones with the base of each ice cream cone spaced separately from the lower edges of the panels;

support rods extending outwardly from the side, front and rear panels and extending downwardly therefrom to a common elevational orientation beneath the lower edges of the panels;

horizontal handles positioned on the side panels adjacent to the upper edges thereof, the handles extending outwardly to an extent greater than the lateral positioning of the lower supports; and a lid of a transparent elastomeric material having an upper rectangular plate of a size essentially to that of the housing and with downwardly extending front, rear and side plates in a rectangular configuration to cover the upper surface of the housing, the lower edges of the vertical plates extending outwardly and downwardly for positioning over the upper edges of the housing.

2. A cone cupcake baker comprising:

a housing having large parallel front and rear walls in a rectangular configuration with long horizontal edges and short vertical edges, the housing having essentially square shaped side panels with horizontal edges and vertical edges coupled to the vertical edges of the front and rear panels, a support plate or a rectangular configuration in a horizontal orientation positioned within the walls adjacent to the upper edges thereof, the support plate having a plurality of rows of apertures with a plurality of apertures in each row, the apertures adapted to support objects with their bases spaced separately from the lower edges of the panels; and support rods extending outwardly from the side, front and rear panels and extending downwardly therefrom to a common elevational orientation beneath the lower edges of the panel.

3. The apparatus as set forth in claim 2 and further including:

horizontal handles positioned on the side panels adjacent the upper edges thereof, the handles extending outwardly to an extent greater than the lateral positioning of the lower supports.

4. The apparatus as set forth in claim 2 and further including:

a lid of a transparent elastomeric material having an upper rectangular plate of a size essentially to that of the housing and with downwardly extending front, rear and side plates in a rectangular configuration to cover the upper surface of the housing, the lower edges of the vertical plates extending outwardly and downwardly for positioning over the upper edges of the housing.

* * * * *